United States Patent
Tang

(10) Patent No.: US 9,858,333 B2
(45) Date of Patent: *Jan. 2, 2018

(54) EFFICIENT STRUCTURED DATA EXPLORATION WITH A COMBINATION OF BIVARIATE METRIC AND CENTRALITY MEASURES

(71) Applicant: International Business Machines Corporation, Armonk, NY (US)

(72) Inventor: Kexia Tang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,095

(22) Filed: Mar. 8, 2016

(65) Prior Publication Data
US 2016/0232227 A1 Aug. 11, 2016

Related U.S. Application Data

(63) Continuation of application No. 14/614,822, filed on Feb. 5, 2015.

(51) Int. Cl.
*G06F 17/30* (2006.01)

(52) U.S. Cl.
CPC .... *G06F 17/30598* (2013.01); *G06F 17/3053* (2013.01); *G06F 17/30339* (2013.01); *G06F 17/30377* (2013.01); *G06F 17/30958* (2013.01)

(58) Field of Classification Search
None
See application file for complete search history.

(56) References Cited

U.S. PATENT DOCUMENTS

| 7,788,284 | B2 * | 8/2010 | Brisbart | G06F 17/30867 707/728 |
|---|---|---|---|---|
| 8,346,757 | B1 * | 1/2013 | Lamping | G06F 17/30663 707/713 |
| 8,396,876 | B2 | 3/2013 | Kennedy et al. | |
| 8,407,164 | B2 | 3/2013 | Malik et al. | |

(Continued)

OTHER PUBLICATIONS

IBM, "List of IBM Patents or Patent Applications Treated as Related (Appendix P)," Mar. 15, 2016, p. 1-2.

(Continued)

*Primary Examiner* — Richard Bowen
(74) *Attorney, Agent, or Firm* — Robert C. Bunker

(57) ABSTRACT

According to one exemplary embodiment, a method for exploring a structured data set is provided. The method may include receiving a plurality of bivariate pairs and an input bivariate pair, wherein the plurality of bivariate pairs and the input bivariate pair are based on the structured data set. The method may include constructing a graph having a plurality of nodes and a plurality of edges based on the received plurality of bivariate pairs and input bivariate pair. The method may include constructing an adjacency matrix based on the constructed graph. The method may include calculating a centrality for each node based on the constructed matrix. The method may include constructing an orthogonal list based on the plurality of bivariate pairs and the input bivariate pair. The method may include ordering the orthogonal list based on the calculated centrality of each node within the plurality of nodes.

7 Claims, 4 Drawing Sheets

(56) References Cited

U.S. PATENT DOCUMENTS

| | | | |
|---|---|---|---|
| 8,736,612 B1 | 5/2014 | Goldman et al. | |
| 8,856,115 B1* | 10/2014 | Huffman | G06F 17/3087 |
| | | | 707/724 |
| 2005/0203878 A1* | 9/2005 | Brill | G06F 17/3064 |
| 2009/0187551 A1* | 7/2009 | Lam | G06F 17/30616 |
| 2011/0246457 A1* | 10/2011 | Dong | G06Q 10/06 |
| | | | 707/725 |
| 2011/0289063 A1* | 11/2011 | Radlinski | G06Q 30/00 |
| | | | 707/706 |
| 2012/0229466 A1 | 9/2012 | Riche et al. | |
| 2012/0311523 A1* | 12/2012 | Venkataraman | G06F 8/71 |
| | | | 717/104 |
| 2013/0013291 A1* | 1/2013 | Bullock | G06F 17/2785 |
| | | | 704/9 |
| 2014/0067829 A1 | 3/2014 | Barney | |
| 2014/0074829 A1 | 3/2014 | Schmidt | |
| 2014/0207385 A1 | 7/2014 | Martin et al. | |
| 2014/0214329 A1* | 7/2014 | Hilser | G06F 19/18 |
| | | | 702/19 |
| 2015/0046384 A1* | 2/2015 | Eck | G06F 17/18 |
| | | | 706/52 |
| 2015/0331866 A1* | 11/2015 | Shen | G06F 17/30861 |
| | | | 707/723 |

OTHER PUBLICATIONS

Tang, "Efficient Structured Data Exploration With a Combination of Bivariate Metric and Centrality Measures," Application and Drawings, filed Feb. 5, 2015, 28 Pages, U.S. Appl. No. 14/614,822.

Langohr, "Methods for Finding Interesting Nodes in Weighted Graphs," PhD Thesis, Series of Publications A, Jun. 2014, Report A-2014-3, Department of Computer Science, University of Helsinki, Finland.

\* cited by examiner

EFFICIENT STRUCTURED DATA EXPLORATION WITH A COMBINATION OF BIVARIATE METRIC AND CENTRALITY MEASURES

BACKGROUND

The present invention relates generally to the field of computing, and more particularly to structured data exploration.

In response to data search queries, algorithms may be used to provide additional information that may interest a querying user from a structured dataset. Additional information may be displayed to the user based on a search term provided for a search. By displaying additional related information, an algorithm may supply information that the user may find interesting and may not have considered before. Furthermore, additional relevant information may produce the search result that the user sought for and may not have obtained due to choosing an incorrect search term.

SUMMARY

According to one exemplary embodiment, a processor-implemented method for exploring a structured data set is provided. The method may include receiving, by a processor, a plurality of bivariate pairs of variables and an input bivariate pair of variables, wherein the plurality of bivariate pairs of variables and the input bivariate pair of variables are based on the structured data set. The method may also include constructing a graph having a plurality of nodes and a plurality of edges based on the received plurality of bivariate pairs of variables and input bivariate pair of variables. The method may then include constructing an adjacency matrix based on the constructed graph. The method may further include calculating a centrality for each node within the plurality of nodes based on the constructed matrix. The method may also include constructing an orthogonal list based on the plurality of bivariate pairs of variables and the input bivariate pair of variables. The method may then include ordering the orthogonal list based on the calculated centrality of each node within the plurality of nodes.

According to another exemplary embodiment, a computer system for exploring a structured data set is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of bivariate pairs of variables and an input bivariate pair of variables, wherein the plurality of bivariate pairs of variables and the input bivariate pair of variables are based on the structured data set. The method may also include constructing a graph having a plurality of nodes and a plurality of edges based on the received plurality of bivariate pairs of variables and input bivariate pair of variables. The method may then include constructing an adjacency matrix based on the constructed graph. The method may further include calculating a centrality for each node within the plurality of nodes based on the constructed matrix. The method may also include constructing an orthogonal list based on the plurality of bivariate pairs of variables and the input bivariate pair of variables. The method may then include ordering the orthogonal list based on the calculated centrality of each node within the plurality of nodes.

According to yet another exemplary embodiment, a computer program product for exploring a structured data set is provided. The computer program product may include one or more computer-readable storage devices and program instructions stored on at least one of the one or more tangible storage devices, the program instructions executable by a processor. The computer program product may include program instructions to receive a plurality of bivariate pairs of variables and an input bivariate pair of variables, wherein the plurality of bivariate pairs of variables and the input bivariate pair of variables are based on the structured data set. The computer program product may also include program instructions to construct a graph having a plurality of nodes and a plurality of edges based on the received plurality of bivariate pairs of variables and input bivariate pair of variables. The computer program product may then include program instructions to construct an adjacency matrix based on the constructed graph. The computer program product may further include program instructions to calculate a centrality for each node within the plurality of nodes based on the constructed matrix. The computer program product may also include program instructions to construct an orthogonal list based on the plurality of bivariate pairs of variables and the input bivariate pair of variables. The computer program product may then include program instructions to order the orthogonal list based on the calculated centrality of each node within the plurality of nodes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
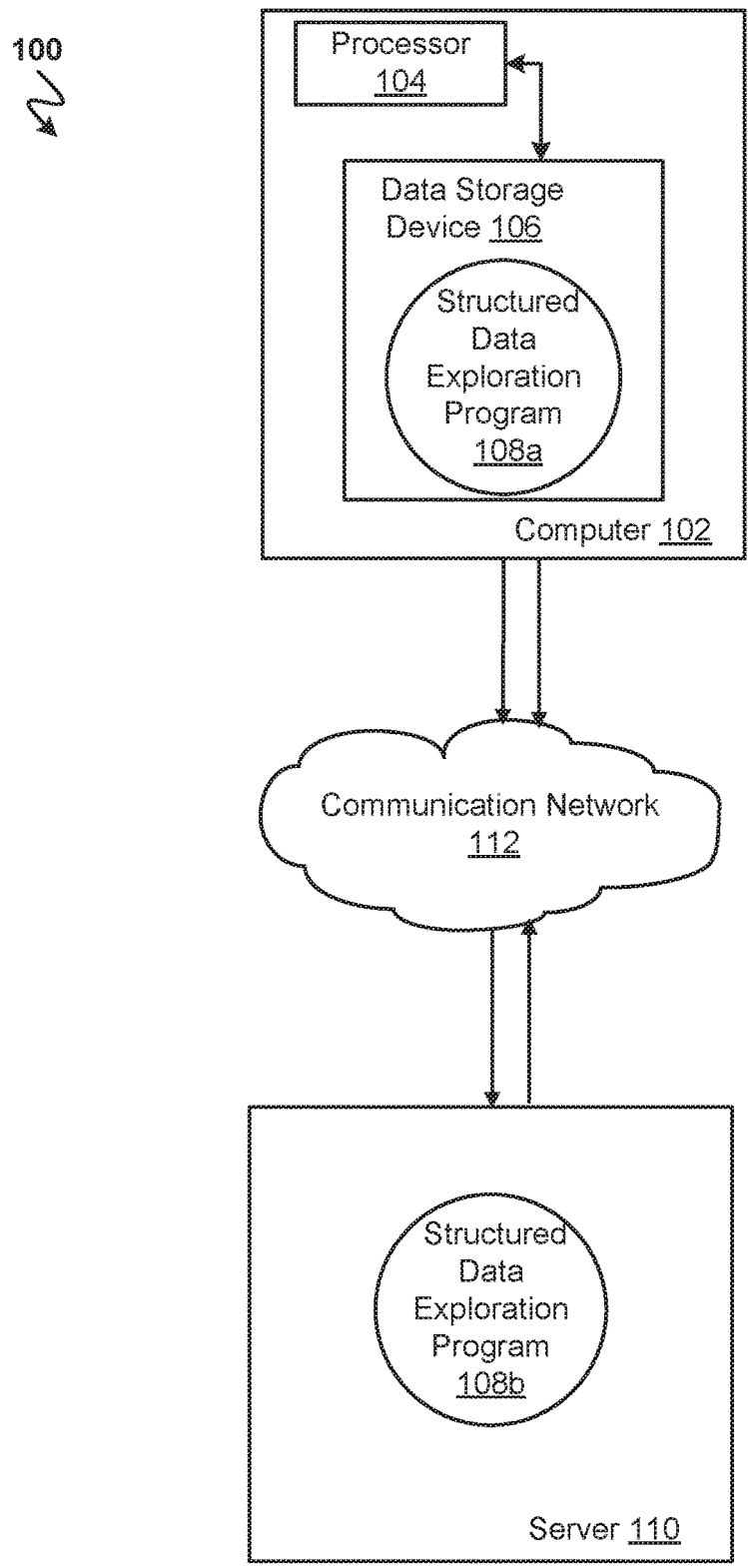
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for efficient structured data exploration with a combination of bivariate metric and centrality measures. Additionally, the present embodiment has the capacity to improve the technical field of searching structured data by utilizing centrality measures in conjunction with bivariate metrics.

As described previously, search results obtained from structured data may include additional information related to the search term that may also interest the originating entity, such as a user. Related information may be returned to the user to provide information that the user may find useful or that may be closer to what the user originally intended to obtain and may not have received due to, for example, supplying incorrect search terms. One way to identify additional information to return to the user may be to rank variables within structured data based on bivariate metrics, such as an interestingness score that may describe a variable's interestingness in relation to the supplied search term. Due to the difficulty in determining what may be interesting related information for the user, existing methods for determining related information may not adequately return information that the user may find interesting.

Therefore, it may be advantageous to, among other things, provide a way to more efficiently find interesting information within structured data by using centrality measures in conjunction with bivariate metrics.

According to at least one embodiment, a process for efficient structured data exploration may receive a list of bivariate pairs (i.e., a pair of variables) including an input bivariate pair. The bivariate pair list may be based on a structured data set and may be created by an analytics engine (e.g., IBM® SPSS® Analytic Catalyst). The bivariate list may contain unique pairs of variables from the structured data. Additionally, each bivariate pair in the list may be assigned by the analytics engine a score based on bivariate metrics, such as an interestingness score. A graph may then be constructed, based on the bivariate pair list. The graph may be constructed with each node representing a variable in the structured data, edges between two variables that form a bivariate pair, and an edge weight based on the bivariate metrics (e.g., interestingness score).

Based on the constructed bivariate graph, an unweighted adjacency matrix may be constructed representing nodes in the graph that may be adjacent (i.e., nodes with a single edge in between). From the unweighted adjacency matrix, the eigenvector or Katz-Bonacich centrality may be used to determine the centrality value for each node in the graph. A node in the graph may then be ranked based on a node metric, such as first averaging the interestingness of the edges terminating at the node. The ranking score for the node may then be calculated, for example, by using a linear combination of node metric (e.g., average interestingness of edges connected to the node) and the centrality value. According to at least one implementation, the linear combination of interestingness and centrality may calculated by adding the average interestingness to the product of gamma and the node's centrality value. Gamma may be determined, for example, by applying supervised machine learning on real user data.

Then, valid bivariate pairs may be selected from the list of bivariate pairs. Valid bivariate pairs may include pairs that contain one variable in common with the input bivariate pair. The valid bivariate pairs may then be ranked based on the ranking score of the variable in the valid bivariate pair that may not be common to the input bivariate pair. The highest ranking bivariate pairs may then be sent to the user, to a program, or to some other entity.

According to at least one other embodiment, a process for efficient structured data exploration may receive a list of bivariate pairs (i.e., a pair of variables) including an input bivariate pair. The bivariate pair list may be based on a structured data set and may be created by an analytics engine. The bivariate list may contain unique pairs of variables from the structured data. Additionally, each bivariate pair in the list may be assigned by the analytics engine a score based on bivariate metrics, such as an interestingness score. A graph may then be constructed, based on the bivariate pair list. The graph may be constructed with a node representing a variable in the structured data, edges between two variables that form a bivariate pair, and an edge weight based on the bivariate metrics (e.g., interestingness score).

Based on the constructed bivariate graph, a weighted adjacency matrix may be constructed representing nodes in the graph that may be adjacent (i.e., nodes with only a single edge in between). The weighted adjacency matrix may be constructed having each node as a column and as a row, and values at column/row intersections that may correspond with the edge weight between the intersecting nodes in the matrix. From the weighted adjacency matrix, the eigenvector or Katz-Bonacich centrality may be used to determine the centrality value for each node in the graph as discussed previously.

Then, valid bivariate pairs may be selected from the list of bivariate pairs. Valid bivariate pairs may include pairs that contain one variable in common with the input bivariate pair. The valid bivariate pairs may then be ranked based on the centrality value of the variable in the valid bivariate pair that may not be common to the input bivariate pair. The highest ranking bivariate pairs may then be sent to the user, to a program, or to some other entity. In the case of equal centrality scores between variables in multiple bivariate pairs that are not common to the input bivariate pair, the centrality score of the other variable in the bivariate pair (i.e., the variable that is found in the input bivariate pair) may be compared to determine the highest ranking bivariate pair.

The first embodiment may be more efficient for controlling the tradeoff between bivariate metrics (e.g., interestingness) and the centrality measure via the coefficient used in generating the ranking score. The second embodiment may be more efficient to use if the bivariate graph may include a complete graph.

Referring now to FIG. 1, an exemplary networked computer environment 100 in accordance with one embodiment is depicted. The networked computer environment 100 may include a computer 102 with a processor 104 and a data storage device 106 that is enabled to run a structured data exploration program 108a. The networked computer environment 100 may also include a server 110 that is enabled to run a structured data exploration program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a structured data exploration program 108a and 108b may run on the client computer 102 or on the server computer 110. The structured data exploration program 108a and 108b may be used to efficiently explore structured data by using centrality measures in conjunction with bivariate metrics. The structured data exploration program 108a and 108b is explained in further detail below with respect to FIGS. 2 and 3.

Figure 2:
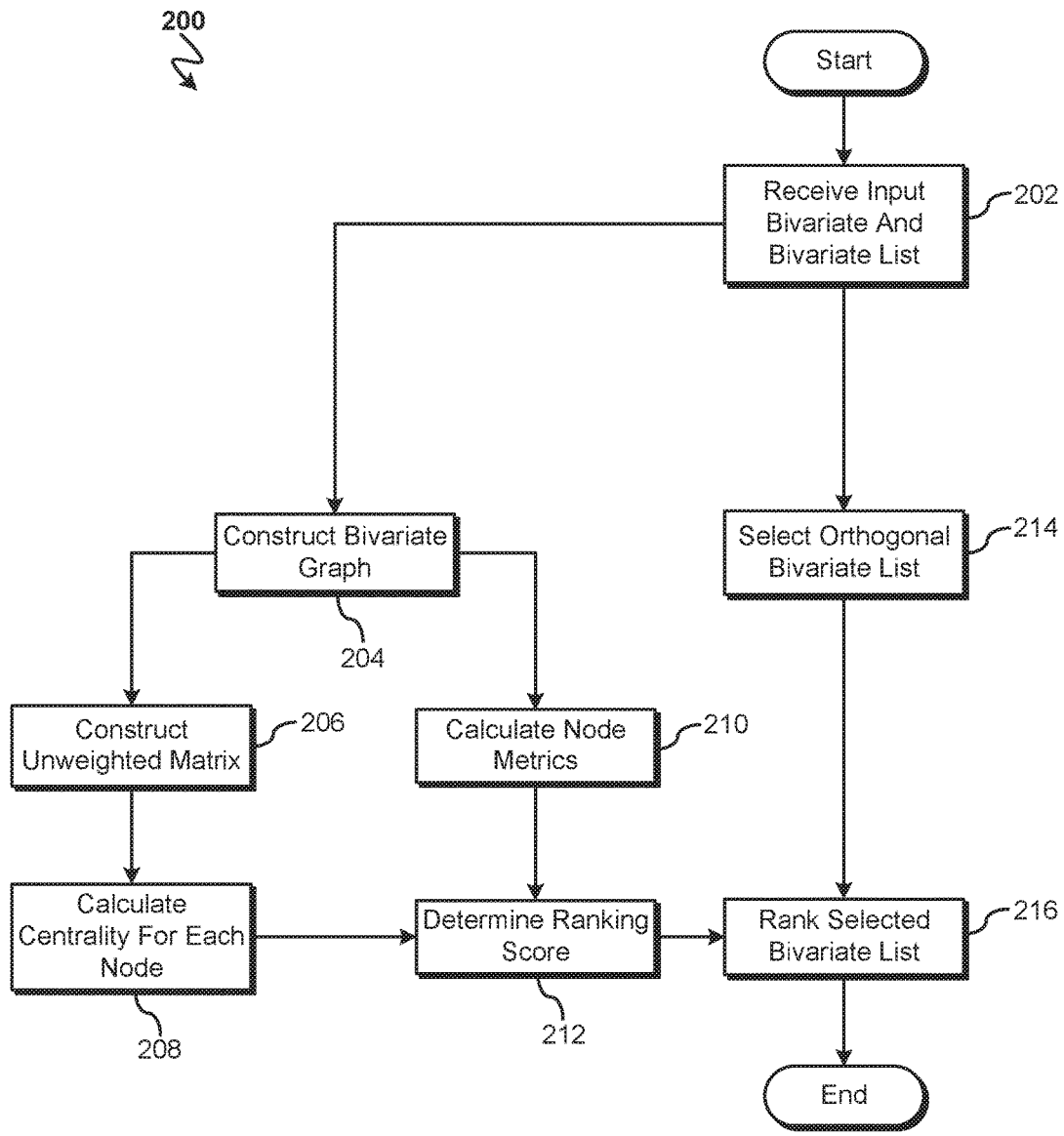
FIG. 2 is an operational flow chart illustrating an unweighted data exploration process for exploring structured data according to at least one embodiment.

Referring now to FIG. 2, an operational flow chart illustrating the exemplary unweighted data exploration process 200 by the structured data exploration program 108a and 108b (FIG. 1) according to at least one embodiment is depicted.

At 202, the unweighted data exploration process 200 may receive an input bivariate pair (i.e., a pair of variables) and an input bivariate list. According to at least one embodiment, the input bivariate pair may be based on a string of words, such as "how is branch related to sales". From the string of words, a bivariate pair of "branch" and "sales" may be extracted by another process, such as an analytic engine (e.g., IBM® SPSS® Analytic Catalyst) and received as input by the unweighted data exploration process 200. The unweighted data exploration process 200 may receive a bivariate list in a data structure, such as an array containing bivariate pairs and associated interestingness values. Additionally, the input bivariate list may also include a metric value (e.g., interestingness score) associated with each bivariate pair in the input bivariate list. For example, the input bivariate pair list may include bivariate pair year/branch that has an interestingness score of 0.95, year/product that has an interestingness score of 0.6, branch/product that has an interestingness score of 0.9, branch/sales that has an interestingness score of 0.8, product/sales that has an interestingness score of 0.85, product/cost that has an interestingness score of 0.8, and sales/cost that has an interestingness score of 0.9.

Next, at 204, a graph may be constructed based on the bivariate pair list. According to at least one embodiment, all variables in the input bivariate list may be represented as nodes in a graph. Bivariate pairs may be represented in the graph as edges connecting the two nodes representing the variables in the bivariate pair. The edges in the graph may then be weighted based on the interestingness score assigned to the bivariate pair. For example, the bivariate pair year/branch may have an interestingness score of 0.95. In the generated graph, year and branch may each be a node with an edge connecting the two nodes since the two variables form a bivariate pair. The edge may then be given a weight of 0.95 since the interestingness score assigned to the bivariate pair is 0.95.

Next, at 206, unweighted data exploration process 200 may construct an unweighted adjacency matrix based on the graph constructed previously. According to at least one embodiment, the matrix may use each variable from the input bivariate list as a column and a row in the adjacency matrix. At the intersection of each row and column, a binary value (i.e., 0 representing no adjacency between nodes and a 1 representing adjacency between nodes) may be used to represent whether or not two nodes are adjacent in the graph. For example, if nodes branch and year are adjacent in the graph (i.e., have one edge in between the nodes), the value at the intersection of row branch and column year will be 1, indicating that the nodes are adjacent. However, if nodes year and sales are not adjacent, the value in the adjacency matrix at the intersection of row year and column sales will be 0, indicating that the two nodes are not adjacent.

Then, at 208, the centrality for the nodes in the graph may be calculated. According to at least one embodiment, the unweighted data exploration process 200 may first determine the largest eigenvalue based on the unweighted matrix using a known equation, such as the eigenvalue equation. After determining the eigenvalue, the eigenvectors for each variable in the matrix may be determined using a known equation, such as the eigenvalue problem. For example, if the given unweighted matrix has year, branch, product, sales and cost as rows and columns having an adjacency value of 1 at the intersection of branch/year, branch/product, branch/sales, year/product, product/sales, product/cost, and sales/cost, the largest eigenvalue may be 2.9354. The resulting eigenvector associated with the eigenvalue may be 0.3505 for the variable year, 0.4700 for the variable branch, 0.5590 for the variable product, 0.4700 for the variable sales, and 0.3505 for the variable cost. The resulting eigenvectors will always be non-negative according to the Perron-Frobenius theorem. According to at least one other embodiment, node centrality may be calculated using Katz-Bonacich centrality.

At 210, metrics (i.e., node metrics) for each node may be calculated. According to at least one embodiment, the metric may be the average interestingness associated with a node. The average interestingness of a node may be calculated by averaging the interestingness of each edge connected to the node. For example, if node year has two connected edges, edge $E_1$ with an interestingness of 0.95 and edge $E_2$ with an interestingness of 0.6, the resulting interestingness of node year will be 0.775 (i.e., (0.95+0.6)/2=0.775).

Next, at 212, the ranking score for each node may be determined. According to at least one embodiment, the ranking score may be determined by using a linear combination of node metrics (e.g., average interestingness) and centrality. For example, the ranking score for the node year may equal the average interestingness of the node added to the product of gamma and the eigenvector for the node. The equation for determining the ranking score for node year may therefore be expressed as 0.775+gamma*0.3505. The optimal value of gamma may be obtained by applying supervised machine learning on real user data.

At 214, an orthogonal list of bivariate pairs may be generated based on the list of bivariate pairs including the input bivariate pair. According to at least one embodiment, the unweighted data exploration process 200 may search the list of bivariate pairs for bivariate pairs that have one variable that matches one variable in the input bivariate pair. Bivariate pairs that have one variable in common with the input bivariate pair may then be included in the orthogonal bivariate pair list. Once all bivariate pairs in the bivariate pair list have been searched, the orthogonal bivariate pair list may be determined to be complete. For example, given an input bivariate pair of branch/sales and a generated bivariate pair list of year/branch, year/product, branch/product, branch/sales, product/sales, product/cost and sales/cost, the resulting orthogonal bivariate pair list may include branch/year, branch/product, sales/product and sales/cost.

Then, at 216, the orthogonal list of bivariate pairs may be ranked based on the ranking score. According to at least one embodiment, each bivariate pair in the orthogonal list may be ranked based on the ranking score associated with the variable in the bivariate pair that is not found in the input bivariate pair. For example, variable branch has a ranking score of 1.3533, product has a score of 1.3465, sales has a ranking score of 1.32, and cost has a ranking score of 1.2005. If the input bivariate pair included the variables branch and sales, bivariate pairs in the orthogonal list having product as a variable (e.g., bivariate pair branch/product or sales/product) may have the highest ranking score. In instances where there may be two or more bivariate pairs with the same ranking score based on the variable not common to the input bivariate pair, then the ranking score for the other variable (i.e., the variable that is common to the input bivariate pair) may be used to differentiate bivariate pairs that may otherwise be equal.

Figure 3:
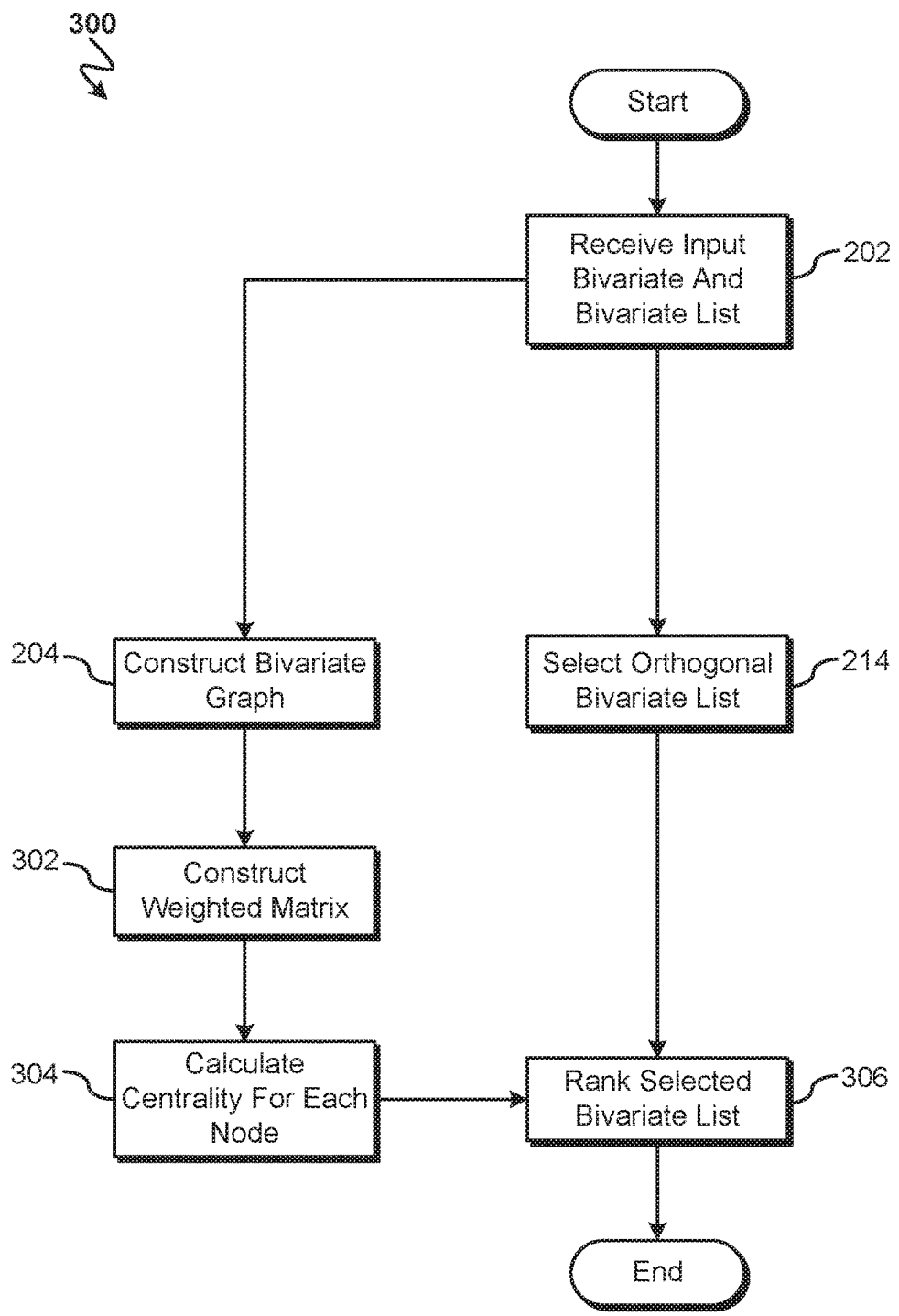
FIG. 3 is an operational flow chart illustrating a weighted data exploration process for exploring structured data according to at least one embodiment.

Referring now to FIG. 3, an operational flow chart illustrating the exemplary weighted data exploration process 300 by the structured data exploration program 108a and 108b (FIG. 1) according to at least one embodiment is depicted.

At 202, the weighted data exploration process 300 may receive an input bivariate pair (i.e., a pair of variables) and an input bivariate list. According to at least one embodiment, the input bivariate pair may be based on a string of words, such as "how is branch related to sales". From the string of words, a bivariate pair of "branch" and "sales" may be extracted by another process, such as an analytic engine (e.g., IBM® SPSS® Analytic Catalyst) and received as input to the weighted data exploration process 300. The weighted data exploration process 300 may receive a bivariate list in a data structure, such as an array containing bivariate pairs and associated interestingness values. The bivariate list may be extracted from a structured data set and associated interestingness score determined by another process, such as IBM® SPSS® Analytic Catalyst and sent as input to the weighted data exploration process 300. Additionally, the input bivariate list may also include a metric value (e.g., interestingness score) associated with each bivariate pair in the input bivariate list. For example, the input bivariate pair list may include bivariate pair year/branch that has an interestingness score of 0.95, year/product that has an interestingness score of 0.6, branch/product that has an interestingness score of 0.9, branch/sales that has an interestingness score of 0.8, product/sales that has an interestingness score of 0.85, product/cost that has an interestingness score of 0.8, and sales/cost that has an interestingness score of 0.9.

Next, at 204, a graph may be constructed based on the bivariate pair list. According to at least one embodiment, all variables in the input bivariate list may be represented as nodes in a graph. Bivariate pairs may be represented in the graph as edges connecting the two nodes representing the variables in the bivariate pair. The edges in the graph may then be weighted based on the interestingness score assigned to the bivariate pair. For example, the bivariate pair year/branch may have an interestingness score of 0.95. In the generated graph, year and branch may each be a node with an edge connecting the two nodes since the two variables form a bivariate pair. The edge may then be given a weight of 0.95 since the interestingness score assigned to the bivariate pair is 0.95.

Next, at 302, weighted data exploration process 300 may construct a weighted adjacency matrix based on the graph constructed previously. According to at least one embodiment, the matrix may use each variable from the input bivariate list as a column and a row in the adjacency matrix. At the intersection of each row and column, the interestingness value may be used to represent that the two nodes are adjacent in the graph. For example, if nodes branch and year are adjacent in the graph (i.e., have one edge in between the nodes) and the interestingness value of the bivariate pair branch/year is 0.95, the value at the intersection of row branch and column year will be 0.95, indicating that the nodes are adjacent and giving the adjacent nodes a weight (e.g., 0.95) based on the interestingness of the bivariate pair. However, if nodes year and sales are not adjacent, the value in the adjacency matrix at the intersection of row year and column sales will be 0, indicating that the two nodes are not adjacent.

Then, at 304, the centrality for the nodes in the graph may be calculated. According to at least one embodiment, the weighted data exploration process 300 may first determine the largest eigenvalue based on the unweighted matrix using a known equation, such as the eigenvalue equation. After determining the eigenvalue, the eigenvectors for each variable in the matrix may be determined using a known equation, such as the eigenvalue problem. For example, if the given unweighted matrix has year, branch, product, sales and cost as a row and a column having a weighted adjacency value of 0.95 at the intersection of branch/year, 0.9 at the intersection of branch/product, 0.8 at the intersection of branch/sales, 0.6 at the intersection of year/product, 0.85 at the intersection of product/sales, 0.8 at the intersection of product/cost, and 0.9 at the intersection of sales/cost, the largest eigenvalue may be 2.4352. The resulting eigenvector associated with the eigenvalue may be 0.3242 for the variable year, 0.4866 for the variable branch, 0.5455 for the variable product, 0.4824 for the variable sales, and 0.3575 for the variable cost. The resulting eigenvectors will always be non-negative according to the Perron-Frobenius theorem. According to at least one other embodiment, node centrality may be calculated using Katz-Bonacich centrality.

At 214, an orthogonal list of bivariate pairs may be generated based on the list of bivariate pairs including the input bivariate pair. According to at least one embodiment, the weighted data exploration process 300 may search the list of bivariate pairs for bivariate pairs that have one variable that matches one variable in the input bivariate pair. Bivariate pairs that have one variable in common with the input bivariate pair may then be included in the orthogonal bivariate pair list. Once all bivariate pairs in the bivariate pair list have been searched, the orthogonal bivariate pair list may be complete. For example, given an input bivariate pair of branch/sales and a generated bivariate pair list of year/branch, year/product, branch/product, branch/sales, product/sales, product/cost and sales/cost, the resulting orthogonal bivariate pair list may include branch/year, branch/product, sales/product and sales/cost.

Then, at 306, the orthogonal list of bivariate pairs may be ranked based on the eigenvector associated with each constituent variable. According to at least one embodiment, each bivariate pair in the orthogonal list may be ranked based on the eigenvector associated with the variable in the bivariate pair that is not found in the input bivariate pair. For example, variable branch has an eigenvector of 0.4866, product has an eigenvector of 0.5455, sales has an eigenvector of 0.4824, and cost has an eigenvector of 0.3575. If the input bivariate pair included the variables branch and sales, bivariate pairs in the orthogonal list having product as a variable (e.g., bivariate pair branch/product or sales/product) would have the highest ranking score. In instances where there may be two or more bivariate pairs with the same eigenvector value based on the variable not in common with the input bivariate pair, then the eigenvector for the other variable (i.e., the variable that is common to the input bivariate pair) may be used to differentiate bivariate pairs that may otherwise be equal.

It may be appreciated that FIGS. 2 and 3 provide only an illustration of two embodiments and does not imply any limitations with regard to how different embodiments may be implemented. Many modifications to the depicted embodiments may be made based on design and implementation requirements.

Figure 4:
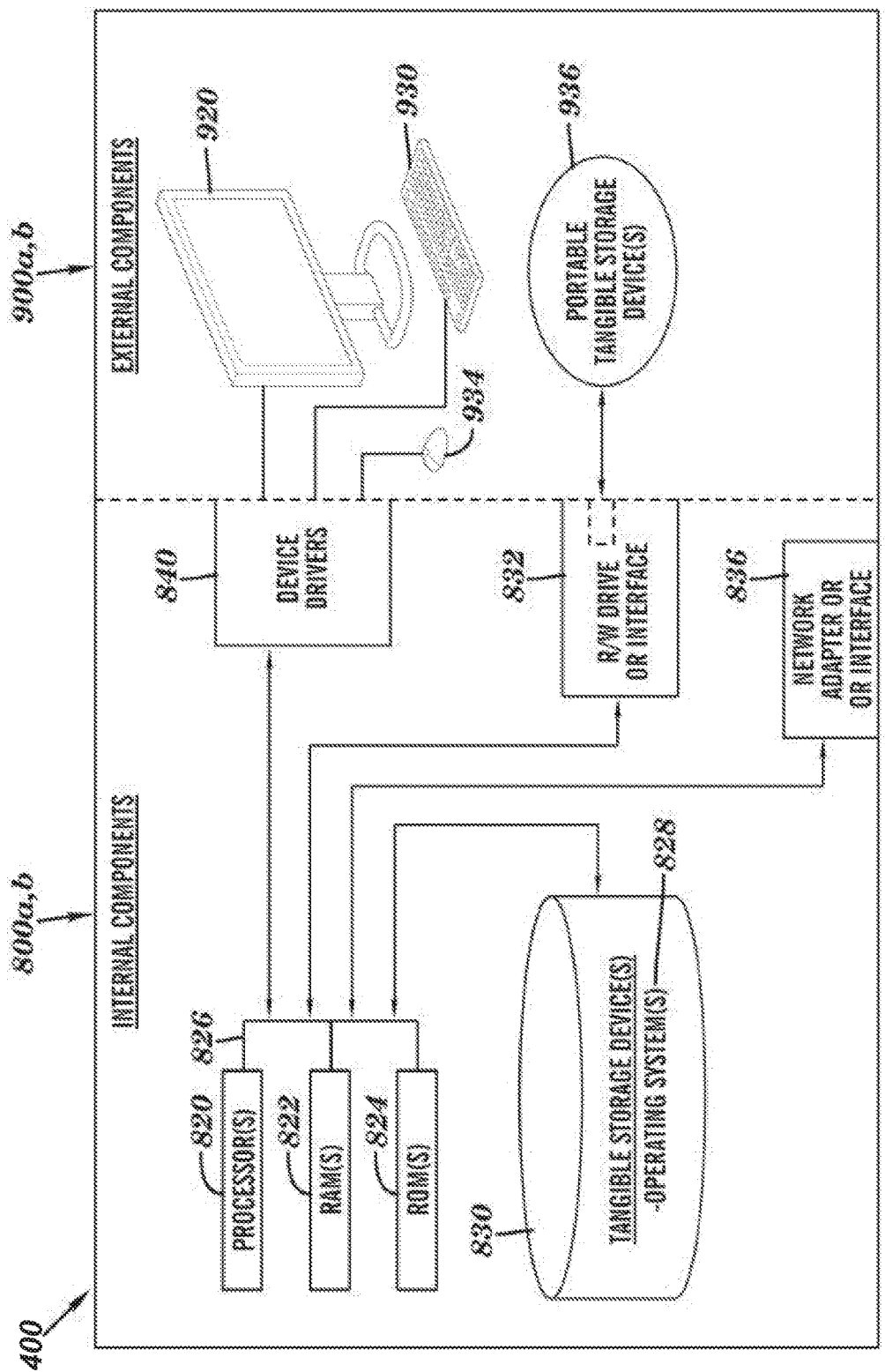
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a structured data exploration program 108a and 108b (FIG. 1), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The structured data exploration program 108a and 108b (FIG. 1) can be stored on one or more of the respective portable computer-readable tangible storage devices 936, read via the respective R/W drive or interface 832 and loaded into the respective hard drive 830.

Each set of internal components 800a, b may also include network adapters (or switch port cards) or interfaces 836 such as a TCP/IP adapter cards, wireless wi-fi interface cards, or 3G or 4G wireless interface cards or other wired or wireless communication links. The structured data exploration program 108a (FIG. 1) in client computer 102 (FIG. 1) and the structured data exploration program 108b (FIG. 1) in network server computer 110 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the structured data exploration program 108a (FIG. 1) in client computer 102 (FIG. 1) and the structured data exploration program 108b (FIG. 1) in network server computer 110 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for exploring a structured data set based on a data search query to identify a plurality of interesting information related to the data search query, the method comprising:

receiving, by a processor, a plurality of bivariate pairs of variables with a corresponding plurality of bivariate metrics, and an input bivariate pair of variables, wherein the plurality of bivariate pairs of variables and the input bivariate pair of variables are derived from the structured data set based on the data search query;

constructing a graph having a plurality of nodes and a plurality of edges based on the received plurality of bivariate pairs of variables and input bivariate pair of variables, wherein each node corresponds with a variable within the received plurality of bivariate pairs or the input bivariate pair of variables, and wherein the plurality of edges are based on the corresponding plurality of bivariate metrics;

constructing an adjacency matrix based on the constructed graph;

calculating a centrality for each node within the plurality of nodes based on the constructed adjacency matrix, wherein the calculated centrality for each node is based on calculating an eigenvalue of the adjacency matrix and an eigenvector of each node within the plurality of nodes, and wherein the calculated centrality corresponds with the eigenvector;

constructing an orthogonal list based on the plurality of bivariate pairs of variables and the input bivariate pair of variables, wherein the constructed orthogonal list includes a subset of the plurality of bivariate pairs of variables that have a common variable with the input bivariate pair of variables;

ordering the orthogonal list based on the calculated centrality of an uncommon variable for each bivariate pair within the subset, wherein the uncommon variable does not match an input variable within the input bivariate pair;

selecting at least one highest ranking bivariate pair from the ordered orthogonal list; and presenting the plurality of interesting information to a user, wherein the presented plurality of interesting information includes the selected at least one highest ranking bivariate pair.

2. The method of claim 1, further comprising:

calculating a node metric for each node within the plurality of nodes based on the constructed graph and the metric value associated with each bivariate pair within the plurality of bivariate pairs of variables and the input bivariate pair of variables; and determining a ranking score for each node within the plurality of nodes based on the calculated node metric and centrality for each node within the plurality of nodes.

3. The method of claim 2, wherein the node metric comprises calculating an average metric value for each edge within the plurality of edges terminating at a single node within the plurality of nodes.

4. The method of claim 1, wherein the adjacency matrix is an unweighted adjacency matrix or a weighted adjacency matrix.

5. The method of claim 4, wherein the adjacency matrix comprises a plurality of rows and a plurality or columns, with each row within the plurality of rows and each column within the plurality of columns corresponding to each node within the plurality of nodes.

6. The method of claim 5, wherein the unweighted adjacency matrix comprises a binary value at an intersection of each row within the plurality of rows and each column within the plurality of columns.

7. The method of claim 5, wherein the weighted adjacency matrix comprises using the metric value at an intersection of each row within the plurality of rows and each column within the plurality of columns.

* * * * *